(12) United States Patent
Gartland et al.

(10) Patent No.: US 12,433,206 B2
(45) Date of Patent: Oct. 7, 2025

(54) BRACKET ASSEMBLY FOR SOLAR PANELS

(71) Applicant: Hortech, Inc., Spring Lake, MI (US)

(72) Inventors: Leo V. Gartland, Norton Shores, MI (US); John Scholten, Grandville, MI (US); David S. MacKenzie, Nunica, MI (US)

(73) Assignee: Hortech, Inc., Spring Lake, MI (US)

( * ) Notice: Subject to any disclaimer, the term of this patent is extended or adjusted under 35 U.S.C. 154(b) by 261 days.

(21) Appl. No.: 17/814,631

(22) Filed: Jul. 25, 2022

(65) Prior Publication Data

US 2023/0026595 A1   Jan. 26, 2023

Related U.S. Application Data

(60) Provisional application No. 63/225,741, filed on Jul. 26, 2021.

(51) Int. Cl.
*A01G 9/24* (2006.01)
*E04D 13/04* (2006.01)
*H02S 20/23* (2014.01)
*H02S 30/10* (2014.01)

(52) U.S. Cl.
CPC ............. *A01G 9/243* (2013.01); *A01G 9/247* (2013.01); *E04D 13/04* (2013.01); *H02S 20/23* (2014.12); *H02S 30/10* (2014.12)

(58) Field of Classification Search
CPC ................................. A01G 9/243; A01G 9/247
See application file for complete search history.

(56) References Cited

U.S. PATENT DOCUMENTS

| | | | |
|---|---|---|---|
| 6,313,438 B1* | 11/2001 | Emerick, Jr. | H02S 20/30 219/528 |
| 6,672,018 B2* | 1/2004 | Shingleton | F24S 25/636 126/621 |
| 9,281,777 B1* | 3/2016 | Borgstrom | F16M 11/38 |
| 9,781,884 B1* | 10/2017 | Iwai | A01C 21/00 |
| 2011/0048504 A1* | 3/2011 | Kinard | H10F 77/935 136/251 |
| 2012/0174478 A1* | 7/2012 | Chen | H02S 20/23 47/17 |
| 2018/0062572 A1* | 3/2018 | Kunesh | F24S 30/452 |
| 2020/0274480 A1* | 8/2020 | Lutian | H02S 20/30 |
| 2020/0295700 A1* | 9/2020 | Vaidyanathan | H10F 19/00 |

(Continued)

*Primary Examiner* — William L Gmoser
(74) *Attorney, Agent, or Firm* — Price Heneveld LLP (57) ABSTRACT

A solar panel and irrigation arrangement support assembly includes first and second elongated rails each configured to be supported by a roof surface, the first elongated rail including a first longitudinally-extending channel, a plurality of vertical legs each having a first end coupled to at least one of the first and second elongated rails, and a second end, a support assembly coupled to the second end of the plurality of legs and configured to support a solar panel, and an irrigation arrangement that includes an irrigation line located within and extending along the first longitudinally-extending channel of the first elongated rail, and a fluid dispersion member in fluid communication with the irrigation line and configured to be located between the solar panel and plant matter supported by the roof surface such that the fluid dispersion member can provide fluid to the plant matter located directly vertically below the solar panel.

16 Claims, 12 Drawing Sheets

(56) References Cited

U.S. PATENT DOCUMENTS

| | | | | |
|---|---|---|---|---|
| 2022/0256779 A1* | 8/2022 | Haastert | ................... | H02S 20/30 |
| 2022/0385230 A1* | 12/2022 | Van Iseghem | ........... | A01G 2/00 |
| 2023/0309460 A1* | 10/2023 | Shamir | ................... | H02S 20/32 |
| | | | | 47/66.6 |
| 2024/0235462 A1* | 7/2024 | Fisher | ..................... | H02S 20/23 |

* cited by examiner

BRACKET ASSEMBLY FOR SOLAR PANELS

CROSS-REFERENCE TO RELATED APPLICATIONS

This application claims priority to U.S. Provisional Patent Application No. 63/225,741, filed on Jul. 26, 2021, entitled "BRACKET ASSEMBLY FOR SOLAR PANELS," the entire disclosure of which is incorporated herein by reference.

BACKGROUND OF THE INVENTION

The present invention relates to a solar panel and irrigation arrangement support assembly, and in particular to a support assembly adapted for use with a planting system for roof applications.

SUMMARY OF THE INVENTION

One embodiment as described and shown herein may include a solar panel and irrigation arrangement support assembly that includes first and second elongated rails each configured to be supported by a roof surface, the first elongated rail including a longitudinally-extending channel, a plurality of vertical legs each having a first end coupled to at least one of the first and second elongated rails, and a second end, a support assembly coupled to the second end of the plurality of legs and configured to support a solar panel, and an irrigation arrangement that includes an irrigation line located within and extending along the first longitudinally-extending channel of the first elongated rail, and a fluid dispersion member in fluid communication with the irrigation line and configured to be located between the solar panel and plant matter supported by the roof surface such that the fluid dispersion member can provide fluid to the plant matter located directly vertically below the solar panel.

Another embodiment as shown and described herein may further or alternatively include a solar panel and irrigation arrangement support assembly that includes first and second elongated rails configured to be supported by a roof surface, where the first and second rail are laterally spaced from one another, a first front leg having a first end coupled to the first elongated rail and a second front leg having a first end coupled to the second elongated rail, the first and second front legs each having a second end, a first rear leg having a first end coupled to the first elongated rail and a second rear leg having a first end coupled to the second elongated rail, the first and second rear legs each having a second end, a support assembly coupled to the second end of each of the legs, and a solar panel supported by the support assembly, wherein a length of both of each of the legs is adjustable, such that a vertical height of the solar panel above the roof surface is adjustable without adjusting an angle between the solar panel and the roof surface.

Yet another embodiment as described and shown herein may alternatively or further include a solar panel and irrigation arrangement support assembly that includes a pair of elongated rails configured to be supported by a roof surface, a pair of front legs each having a first end coupled to a respective one of the pair of rails, and a second end, a pair of rear legs each having a first end coupled to a respective one of the pair of rails, and a second end, a support assembly coupled to the second end of each of the legs, a solar panel supported by the support assembly, and a fluid dispersion member supported below the solar panel and configured to supply fluid to plant matter supported by the roof surface and located directly vertically below the solar panel.

Still yet another embodiment as described and shown herein may further or alternatively include a solar panel and irrigation arrangement support assembly that includes a first elongated rail configured to be supported by a roof surface, a second elongated rail configured to be supported by the roof surface and laterally spaced from the first elongated rail, a plurality of legs extending upwardly from the first and second elongated rails, a support assembly supported by the plurality of legs, wherein the support assembly is configured to support a solar panel, and a first load strap coupled to and extending between the first and second elongated rails, wherein the first load strap is configured to abut the roof surface.

Another embodiment as described and shown herein may further or alternatively include a solar panel and irrigation arrangement support assembly that includes first and second elongated rails each configured to be supported by a roof surface and each including a first connection surface that includes a plurality of irregularities, a plurality of legs extending upwardly from the first and second elongated rails, each of the legs of the plurality of legs having a first end connected to at least one of the first and second elongated rails, and a second end configured to support a first solar panel therefrom, and a first connector bracket connected to and extending at least one of between the first and second elongated rails, wherein the first connected bracket and a leg of the plurality of legs abuts the plurality of irregularities of the first connection surface of each of the first and second elongated rails to provide an electrical ground therebetween.

Yet another embodiment as described and shown herein may further or alternatively include a solar panel and irrigation arrangement support assembly that includes first and second elongated rails each configured to be supported on a roof surface, the first elongated rail including a pair of side walls that cooperate to define a first height of a longitudinally-extending first channel, a support arrangement supported above the first and second elongated rails, a solar panel supported by the support arrangement, and a first pair of side wall extensions coupled to the pair of side walls and that cooperate to define a second height of the longitudinally-extending first channel that is greater than the first height.

Still yet another embodiment as described and shown herein may further or alternatively include a solar panel and irrigation arrangement support assembly kit that includes first and second elongated rails each configured to be supported on a roof surface, the first elongated rail including a pair of side walls that cooperate to define a first height of a longitudinally-extending first channel, a support arrangement supported above the first and second elongated rails, a solar panel supported by the support arrangement, a first pair of side wall extensions configured to couple to the pair of side walls and that cooperate to define a second height of the longitudinally-extending first channel that is greater than the first height, and a second pair of side wall extensions configured to couple to the pair of side walls and that cooperate to define a third height of the longitudinally-extending first channel that is greater than the second height.

These and other features, advantages, and objects of the present invention will be further understood and appreciated

DETAILED DESCRIPTION

Figure 1:
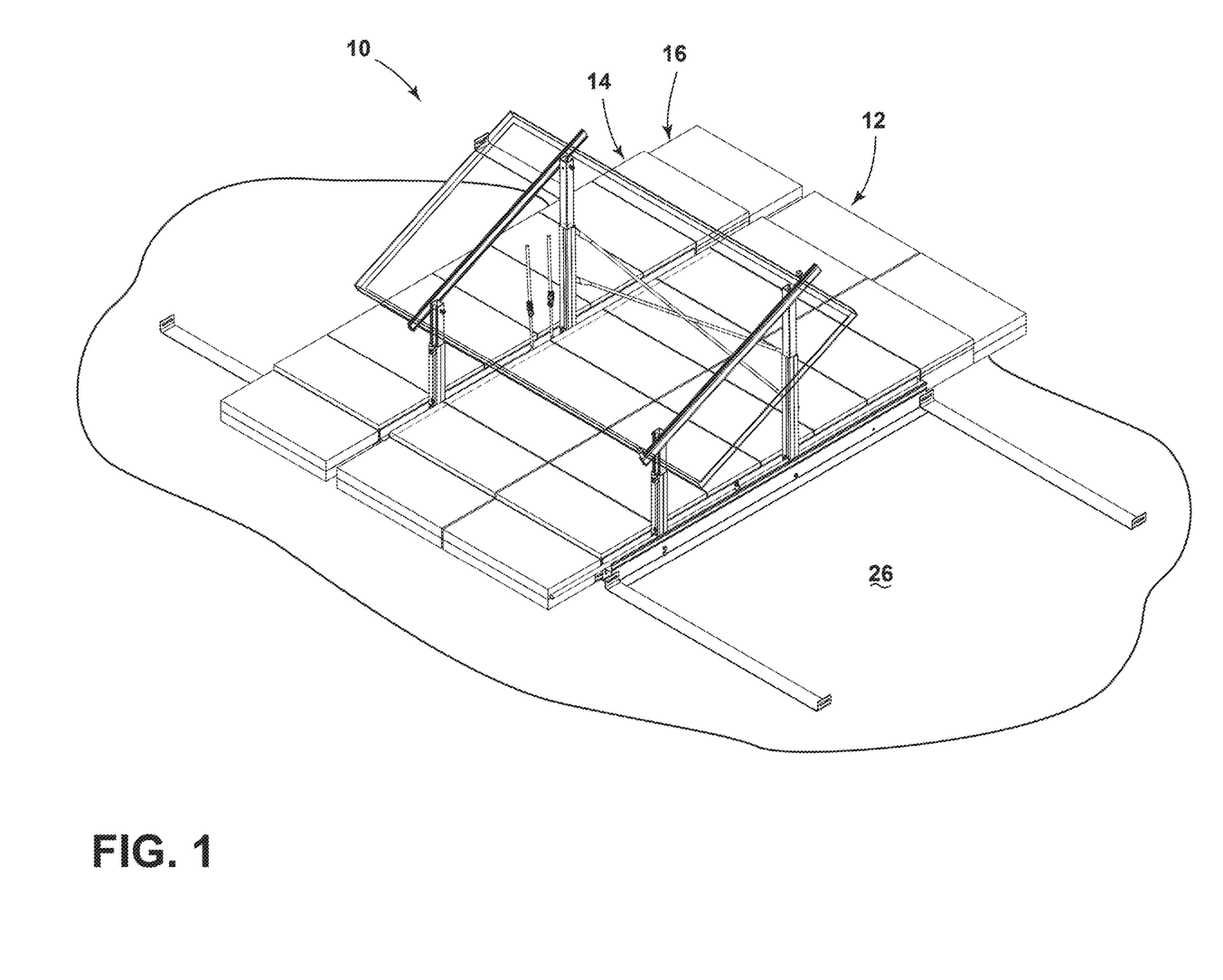
FIG. 1 is a perspective view of a solar panel and irrigation arrangement support assembly and a modular planting system.
Figure 2:
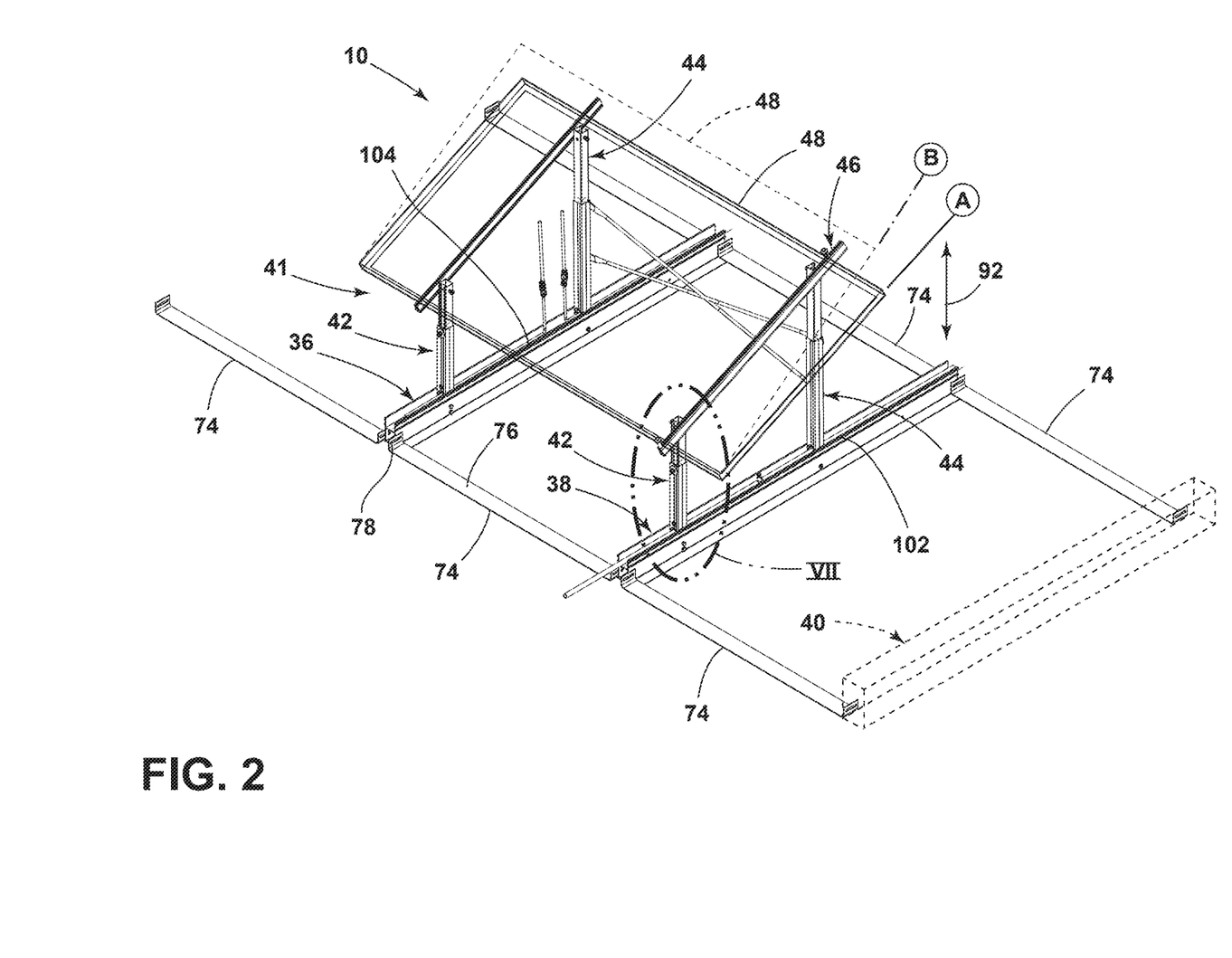
FIG. 2 is a perspective view of the solar panel and irrigation arrangement support assembly with a supported solar panel in multiple orientations.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIGS. 1 and 2) generally designates a solar panel and irrigation arrangement support assembly configured for use with a roof planting application, and in particular with a modular planting system 12 for roof applications. In the illustrated example, the roof planting system may include a plurality of green roof planter modules 14 interspaced with a plurality of paver assemblies or walkway modules 16. It is noted that the modular planting system 12 could also be utilized on a ground surface.

Figure 3:
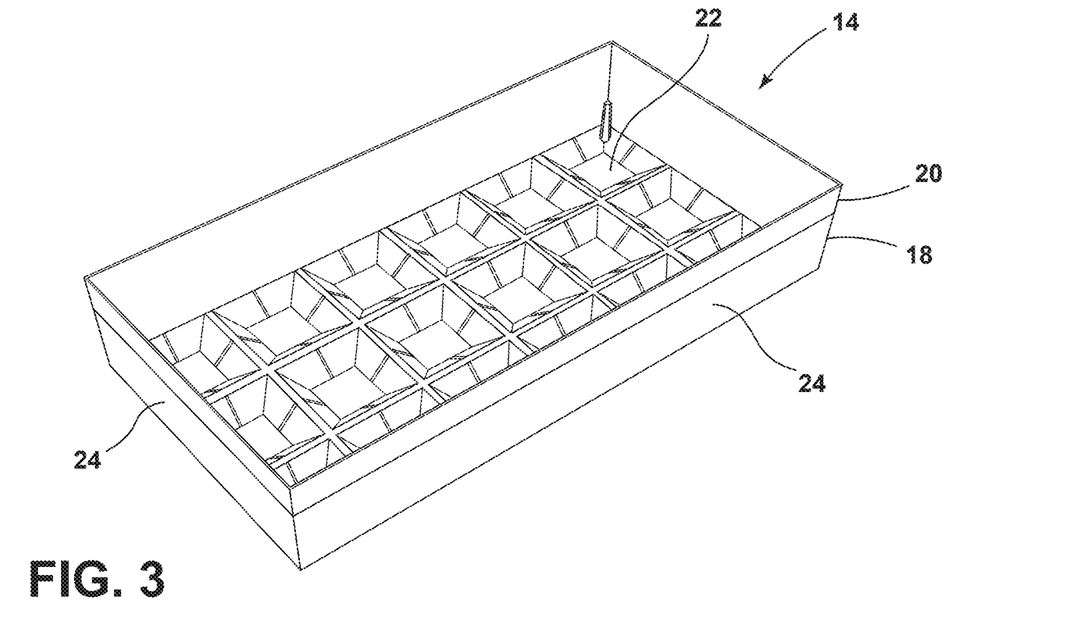
FIG. 3 is a perspective view of a planter module of the modular planting system.

In the illustrated example, each planter module 14 (FIGS. 1 and 3) may include a planter 18 and a collar 20 extending upwardly from an upper edge of the planter 18. The planter 18 may comprise a polymeric material, while the collar 20 may comprise a polymeric material or biodegradable material. Each planter 18 includes a bottom wall 22 and a plurality of side walls 24 that cooperate to define an interior space configured to receive plants and plant growing aggregate therein. The planters 18 are configured to be placed side-by-side upon a roof surface 26. The removable collar 20 is configured to support aggregate and plant matter at an elevation that exceeds an upper edge of the side wall(s) 24 of the planter 18. The planter modules are further described in U.S. Pat. No. 8,555,546, entitled Modular Planting System for Roof Applications, as filed Sep. 3, 2009, and issued Oct. 15, 2013, and U.S. Pat. No. 8,707,618, entitled Modular Planting System for Roof Applications, filed Mar. 6, 2013, and issued Apr. 29, 2014, each of which are incorporated herein by reference in their entirety.

Figure 4:
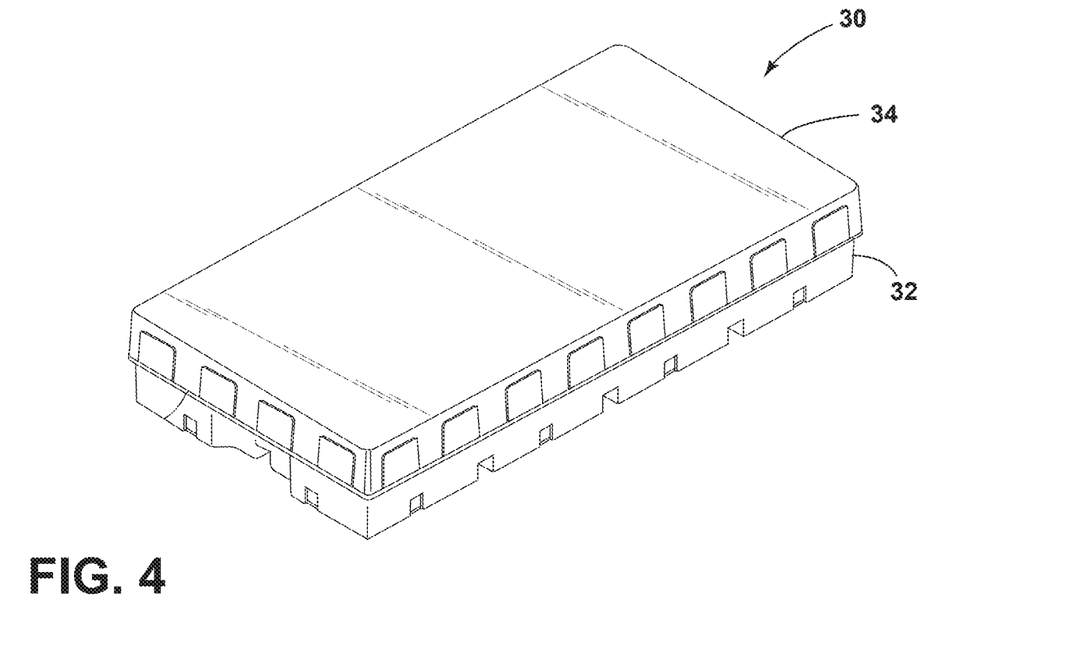
FIG. 4 is a perspective view of a walkway assembly of the modular planting system.

Each paver assembly or walkway assembly 30 (FIGS. 1 and 4) includes a support or substrate member 32 configured to be supported on the roof surface 26, and an overlay member 34 supported by the support member 32. In the illustrated example, the overlay member 34 may include stone that is separate from the support member 32 or concrete or other material molded about the support member 32. An example of the walkway module or paver assembly 30 is further described in U.S. Pat. No. 8,075,221, entitled Paver Assembly, as filed Nov. 12, 2009, and as issued Dec. 13, 2011, the entire disclosure of which is incorporated herein by reference in its entirety.

In the illustrated example, the support assembly 10 (FIG. 2) includes a plurality of elongated rails including a first rail 36, a second rail 38 and a third rail 40, each laterally spaced from and extending substantially parallel to one another, a support arrangement 41 that includes a plurality of legs including a pair of front legs 42 and a pair of rear legs 44 supported by and extending upwardly from the rails 36, 38, and a panel support assembly 46 supported by the legs 42, 44 and configured to support at least one solar panel 48. Additional rails and legs may be utilized as necessary to support a given number of solar panels 48.

In the illustrated example, each elongated rail 36, 38, 40 (FIGS. 5 and 6) includes a planar bottom wall 50 configured to abut the roof surface 26, a body portion 52 having a rectangularly-shaped cross-sectional configuration and extending upwardly from the bottom wall 50 and including a mid-wall 53, and a pair of side walls 54 each extending upwardly from the body portion 52, wherein the side walls cooperate to define an elongated channel 56 that extends along the length of the associated rail 36, 38, 40, and defines a height X of the first rail 36. Each rail 36, 38, 40 may also include a pair of side wall extensions 60 that snappingly and/or slidably engage cooperating C-shaped connector portions 62 extending outwardly from the side walls 54, where the side walls 54 and the side wall extensions 60 cooperate to define a second height Y of the rail 36, 38, 40 that is greater than the first height X. In the illustrated example, each side wall 54 includes an outwardly-opening C-shaped channel 57, while each side wall extension includes a T-shaped engagement portion 61 that is slidably received within the corresponding C-shaped channel 57, a pair of wall portions 63 extending upwardly from the engagement portion 61, and an outwardly-opening C-shaped channel 65. The side wall extensions 60 may be provided so as to increase the overall height of the rail 36, 38, 40 for use with planter modules 14 and/or walkway modules 16 of varying overall heights. Of course, additional or alternative side wall extensions (not shown) that are greater or lesser in width than the side wall extensions 60 may also be provided such that the overall rail 36, 38, 40 may be adjusted and configured for use with various planter and walkway modules 14, 16. The overall heights of the planter modules 14 and/or walkway modules 16 may vary depending upon the aesthetics required for the overall planting system 12, the particular plants supported within the planter modules 14, the spacing requirements between the supported solar panel(s) 48 and the planting system 12, the architectural requirements/layout of the supporting roof structure, and the like.

Figures 5, 6:
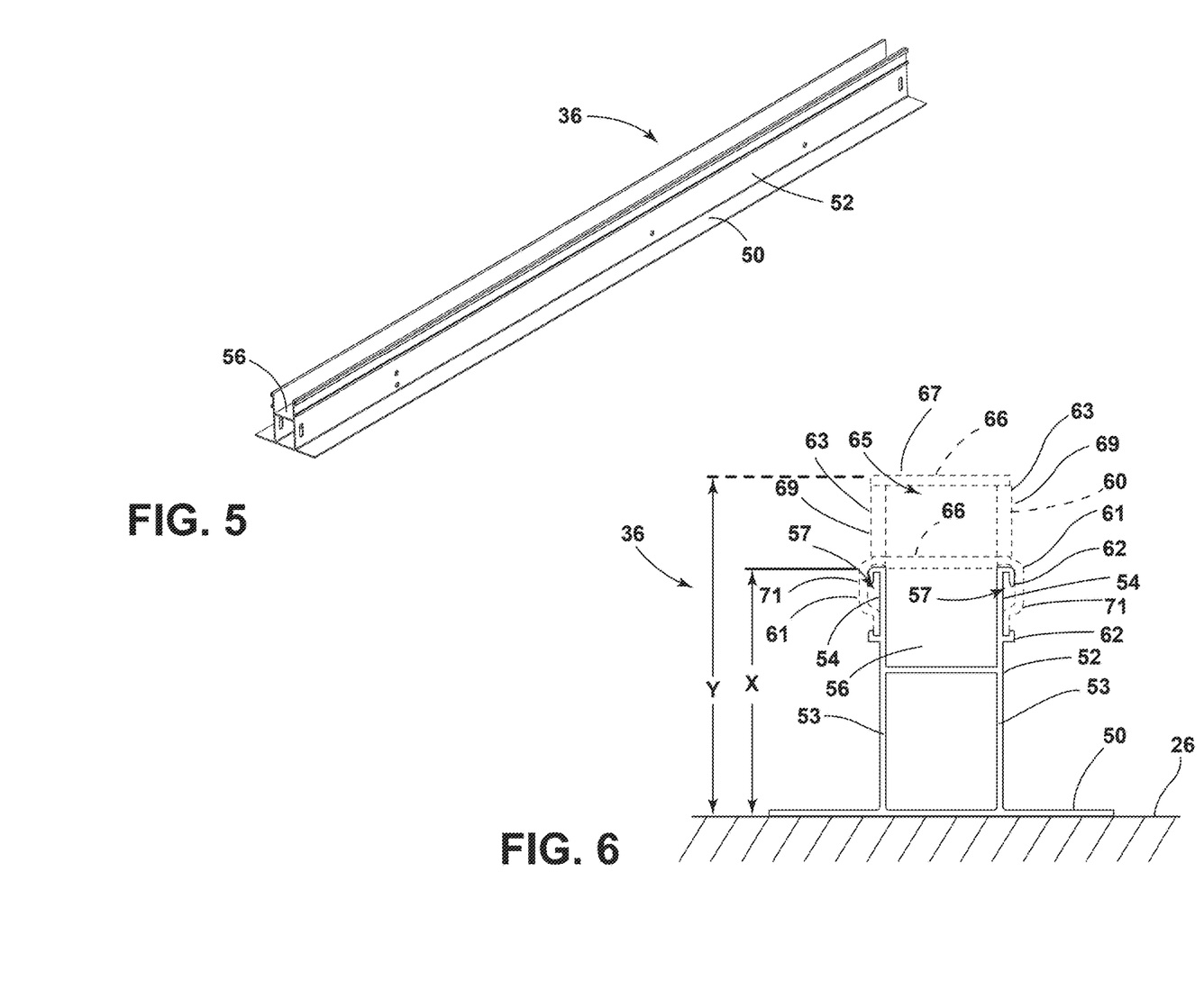
FIG. 5 is a perspective view of an elongated rail.
FIG. 6 is an end elevation view of the elongated rail.

A cap member 66 may snappingly or slidably engage the rail 36, 38, 40 and/or the side wall extensions 60 so as to cooperate with the side walls 54 and/or the side wall extensions 60 to enclose the channel 56. In the illustrated example, the cap member 66 includes a top wall 67, a pair of side walls 69 extending downwardly from the top wall 67, and a pair of engagement portions 71 extending downwardly and inwardly from the corresponding side wall 69. In assembly, the cap member 66 is vertically aligned with the rail 36 and then forced downwardly causing the engagement portions 71 to ride over an upper portion of the C-shaped channels 57 of the rail 36 or the C-shaped channels 65 of the side wall extensions 60 thereby causing the side walls 69 of the cap member 66 to flex outwardly until the engagement portions 71 clear the upper portions of the channels 57, 65 and engage an underside of the upper portions of the channels 57, 65.

The support assembly 10 may further include a plurality of load straps or brackets 74 extending between and coupling the rails 36, 38, 40 to one another. In the illustrated example, each load strap 74 includes a body portion 76 configured to abut the roof surface 26, and a pair of end portions 78 extending upwardly from the body portion 76 and coupled to a pair of the rails 36, 38, 40 via a plurality of mechanical fasteners such as bolts (not shown). Additional load straps 74 may be utilized to couple the first and/or second rail 36, 38 to a third rail 40, or additional rails. Each of the load straps 74 is configured so as to abut the roof surface 26, thereby dispersing the load exerted by the support assembly 10 and the solar panel(s) onto the roof surface 26. As best illustrated in FIG. 1, the modules 14, 16 of the modular planting system 12 are placed over the load straps 74, such that the individual and combined weight of the modules 14, 16 hold the overall support assembly 10 against the roof surface 26 thereby preventing the support assembly 10 and supported solar panel(s) 48 from being shifted with respect to or lifted from the roof surface 26 due to wind loads.

Figure 7:
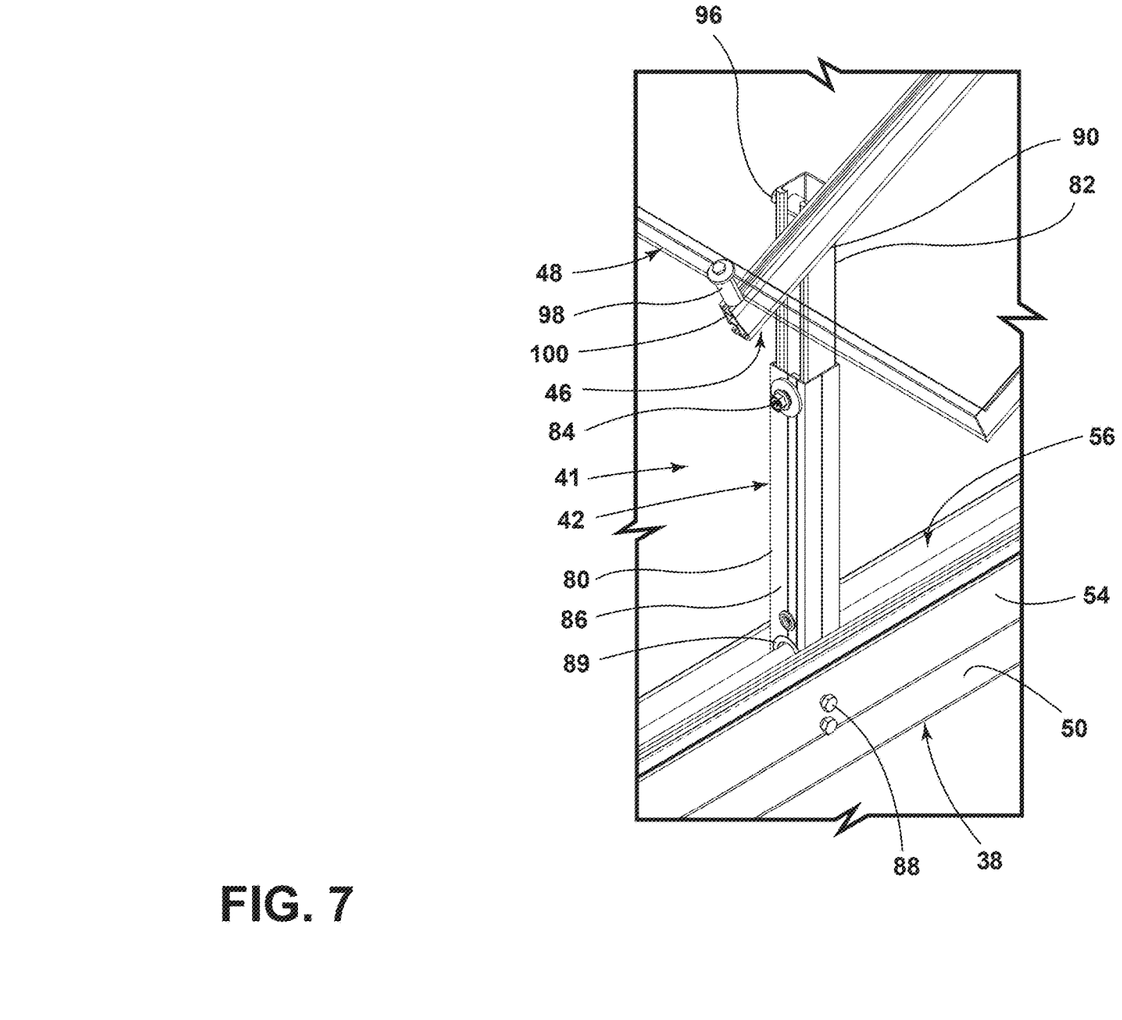
FIG. 7 is an enlarged, partial perspective view of the area VII, FIG. 2.

As noted above, the support arrangement 41 extending upwardly from the rails 36, 38 and supporting the panel support assembly 46 includes the front legs 42 and the rear legs 44. As each of the legs 42, 44 are similarly constructed, a front leg 42 is described herein as an example. As best illustrated in FIG. 7, the front leg 42 includes a lower leg member 80 and an upper leg member 82 telescopingly received within the lower leg member 80. A lock bolt arrangement 84 allows the front leg 42 to be positioned and secured at an overall selected length or height. A lower end 86 of the lower leg member 80 is received within the channel 56 of the rail 38 and is secured to side walls 54 of the rail 38 via a plurality of mechanical fasteners such as bolts 88. The lower end 86 of the lower leg member 80 may also include an aperture 89 extending therethrough so as to allow the routing of irrigation and/or electrical lines along the channel 56 in an uninterrupted manner, as further described below. An upper end 90 of the upper leg member 82 is configured to couple to the panel support assembly 46, as described below. In operation, the adjustable length of the legs 42, 44 allows the overall height of the panel support assembly 46 and the solar panel 48 to be adjusted relative to the roof surface 26 in the directions 92, thereby allowing an installer and/or user to position the solar panel 48 at an optimal height above the roof surface 26 for optimal plant growth of plants contained in the planter modules 14, adjustment for wind shear and loads, and the like. The adjustable length of the legs 42 and 44 allow the relative angle between the solar panel 48 and the roof surface 26 to remain constant as the overall height or distance of the solar panel 48 above the roof surface 26 is adjusted, while additionally or alternatively, the individual adjustability of the front legs 42 and the rear legs 44 allow an installer or operator to adjust the relative angle between the solar panel 48 and the roof surface 26 to be adjusted between a relative lower angle A and a relative higher or steeper angle B depending on the positioning of the support assembly 10 relative to the incident light, and/or the relative geographical location at which the support assembly 10 is installed.

As best illustrated in FIGS. 2 and 7, the panel support assembly 46 includes a pair of solar panel support bars 94 each extending between a pairing of the front legs 42 and the rear legs 44. In the illustrated example, each support bar 94 is secured to the upper end 90 of the relative legs 42, 44 via a mechanical fastener, such as a bolt 96 pivotably received within the upper end 90 of the associated leg 42, 44. Support legs 98 extend from opposite ends of each of the support bars 94 and are configured to secure the solar panel 48 to the panel support assembly 46. Each support leg 98 is configured to engage a C-shaped channel 100 and may be repositioned along the length of the channel 100 so as to accommodate solar panels 48 of various sizes and configurations.

Figure 8:
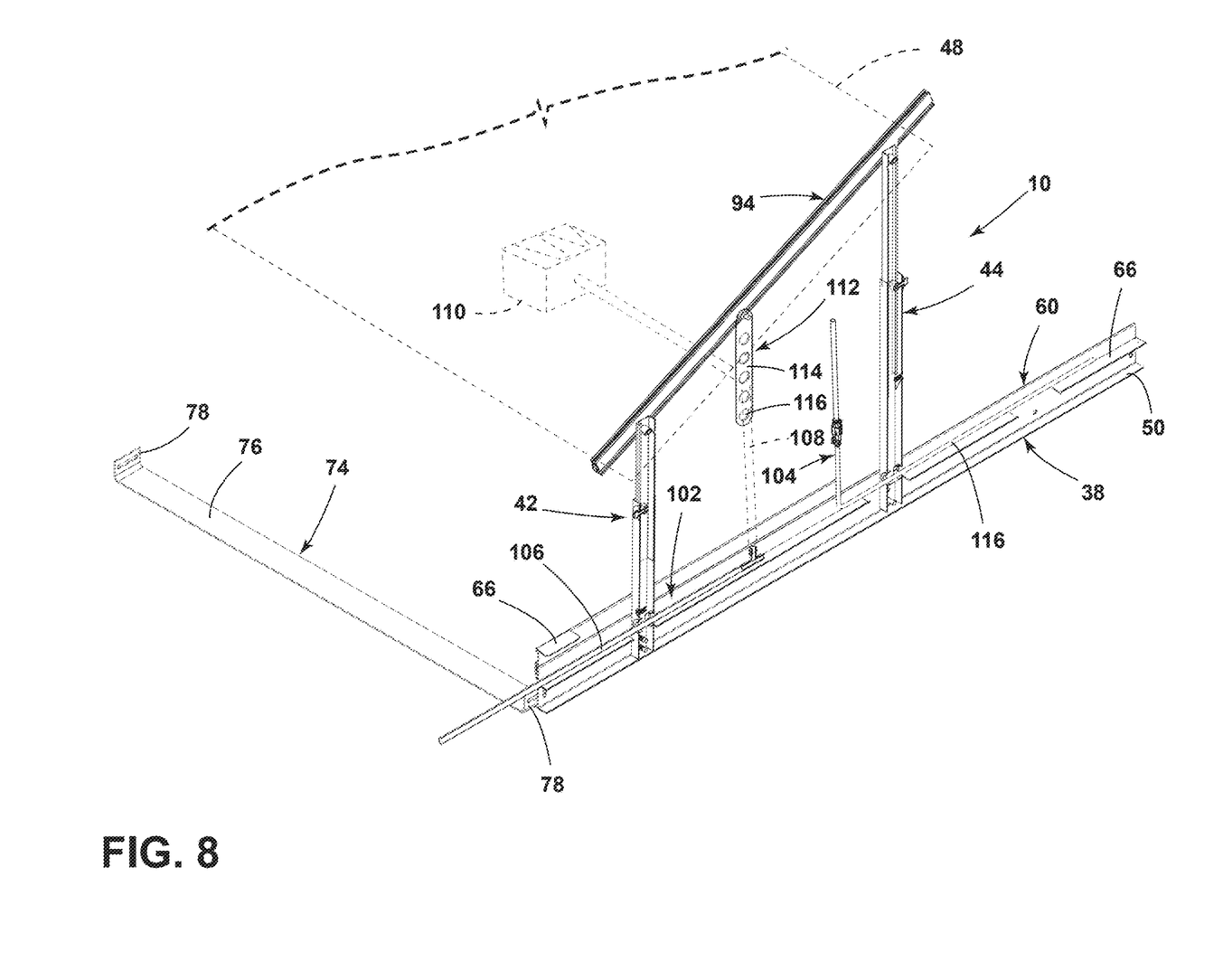
FIG. 8 is a perspective view of the support assembly supporting an irrigation system and an electrical system.

As best illustrated in FIGS. 2 and 8, the solar panel and irrigation arrangement support assembly 10 may further include an irrigation system or assembly 102 and an electrical system or assembly 104. In the illustrated example, the irrigation assembly 102 may include a plurality of irrigation or water lines 106 routed along the channel 56, irrigation or water lines 108 extending upwardly from the irrigation lines 106 to an irrigation device 110 such as a sprinkler that is positioned beneath the associated solar panel 48 at a location that is between the solar panel 48 and the planter modules 14 positioned directly vertically below the solar panel 48. A hanger arrangement 112 may be provided to support the irrigation lines 108 and/or the irrigation device 110. In the illustrated example, the irrigation device 110 includes one or more hanger brackets 114 coupled to and extending downwardly from an associated solar panel support bar 94. The hanger bracket 114 may be provided with a plurality of vertically spaced apertures 119 configured so as to allow the irrigation lines 108 and/or irrigation device 110 to be supported at various pre-selected vertical positions beneath the associated solar panel 48.

The electrical system 104 may include electrical lines 116 that extend along the channel 56 of the associated rail 36, 38, 40 and upwardly to operably couple with the associated solar panel 48. The electrical system 104 may include electrical quick connects/disconnects 117 spaced along the electrical lines 116, therefore allowing an installer to easily add or replace portions of the electrical lines 116 or solar panels 48 hardwired with portions of the electrical lines 116 without having to remove all or significant portions of the overall electrical system 116.

Figures 9, 10:
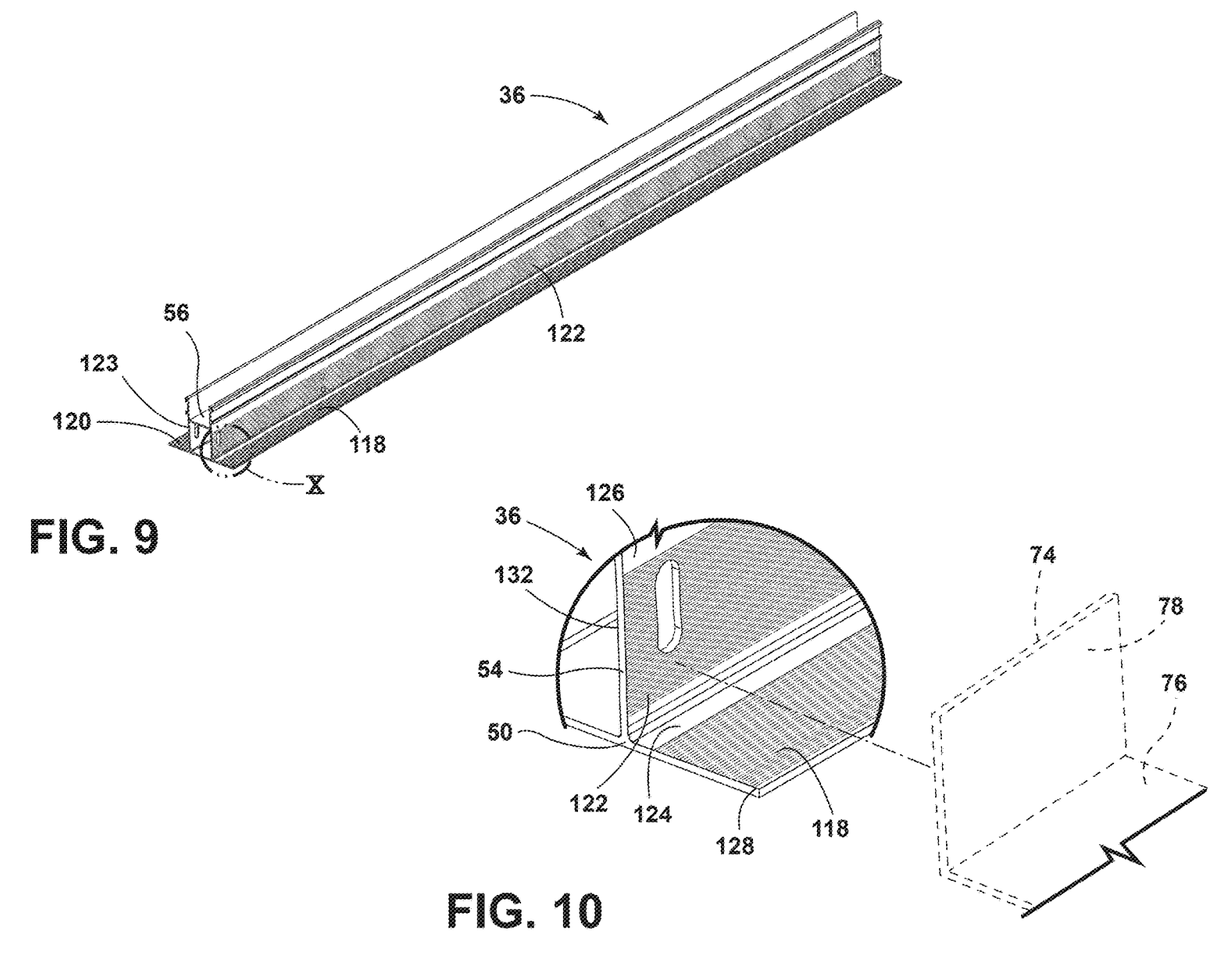
FIG. 9 Is a perspective view of an alternative embodiment of the elongated rail.
FIG. 10 is an exploded, partial perspective view of the area X, FIG. 9, and a load strap.

In another embodiment, the rails 36, 38, 40 (FIGS. 9 and 10) may include a plurality of grounding arrangements configured to facilitate proper grounding of the components of the solar panel and irrigation arrangement support assembly 10. In the illustrated example, the grounding arrangements include a first grounding arrangement 118 located on an upper surface 124 of the bottom wall 50 of the rail 36, 38, 40, a second grounding arrangement 120 located on the upper surface 124 of the bottom wall 50 opposite the first grounding arrangement 118 with respect to the channel 56, a third grounding arrangement 122 located on an outer surface 126 of the side wall 54 of the rail 36, 38, 40, and a fourth grounding surface 123 located on an outer surface of the opposite side wall 54. In the illustrated example, each grounding arrangement 118, 120, 122, 123 may include a plurality of irregularities including longitudinally-extending grooves or teeth 128, although other irregularities or protuberances may be utilized which would facilitate enhancing the grounding of the various components of the support assembly 110. The grooves or teeth 128 may be extruded with the associated rail 36, 38, 40 or may be formed in another suitable manner. By way of example, and as best illustrated in FIG. 10, the first grounding arrangement 118 and the third grounding arrangement 122 are configured so as to abut the body portion 76 and an end portion 78 of one of the load straps 74, thereby providing proper grounding between the load strap 74 and the rail 36. The grounding arrangements as shown and described herein provided proper and enhanced grounding between the various rails 36, 38, 40. In addition, it is noted that similar grounding arrangements may be provided on inner surfaces 132 of the side walls 54 of any of the rails 36, 38, 40 so as to provide a proper and enhanced grounding between the rails 36, 38, 40 and the legs 42, 44.

The reference numeral 10a (FIGS. 11 and 12) generally designates another embodiment of the solar panel and irrigation arrangement support assembly configured for use with a roof planting application, and in particular with the modular planting system 12 as previously described. Since the solar panel irrigation system 10a share some similar and parts to the previously described system 10, similar parts appearing in FIGS. 1-10 and FIGS. 11-15, respectively are represented by the same, corresponding reference numeral, except for the suffix "a" in the numerals of the latter.

In the illustrated example, the support assembly 10a (FIG. 11) includes a plurality of elongated rails including a first rail 36a and a second rail 38a laterally spaced from and extending substantially parallel to one another, a support arrangement 41a that includes a plurality of legs including a pair of front legs 42a and a pair of rear legs 44a supported by and extending upwardly from the rails 36a, 38a, and a panel support assembly 46a supported by the legs 42a, 44a and configured to support at least one solar panel 48a. Additional rails and legs may be utilized as necessary to support a given number of solar panels 48a.

Figure 12:
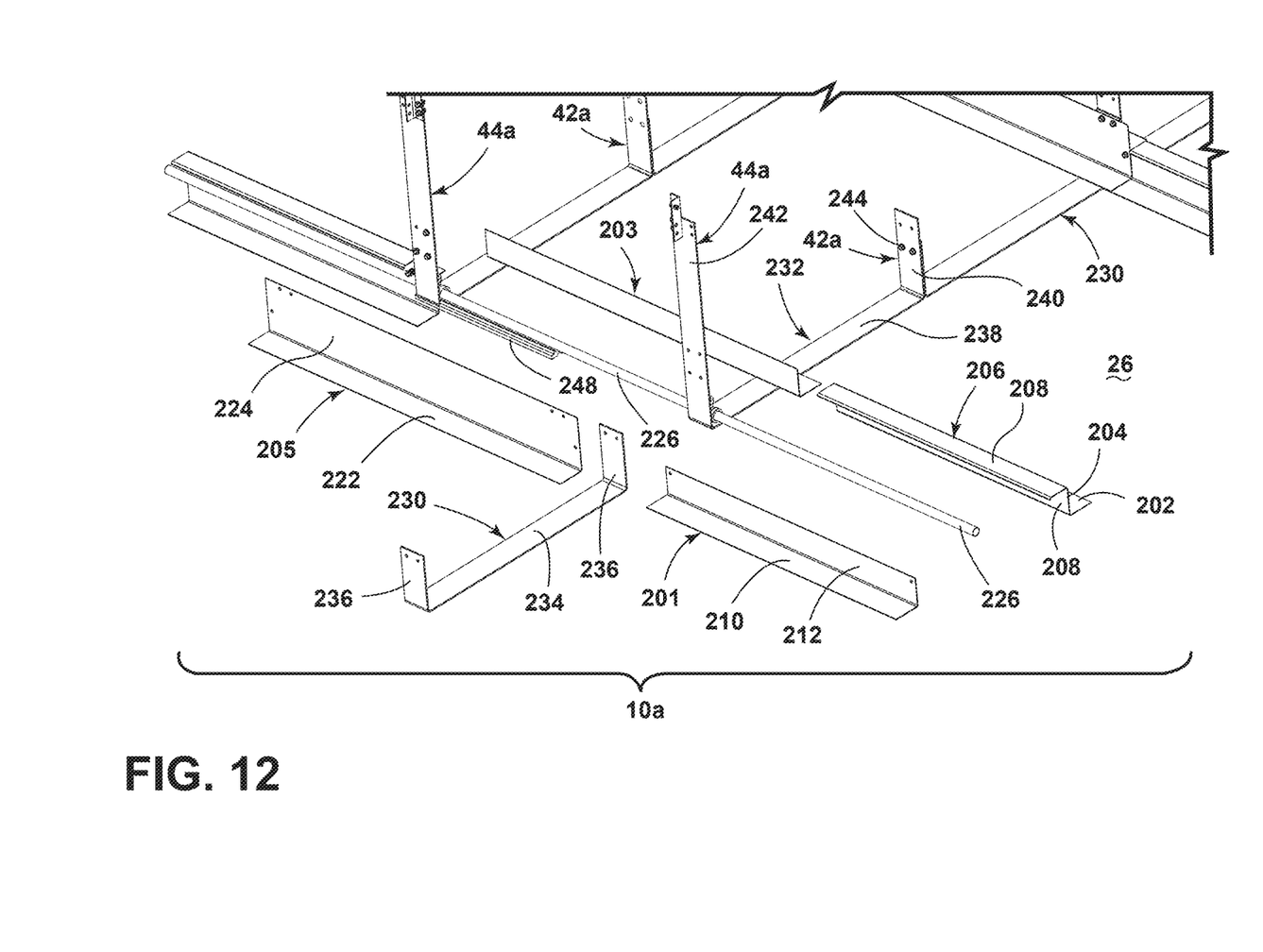
FIG. 12 is an exploded perspective view of the support assembly of FIG. 11.
Figure 13:
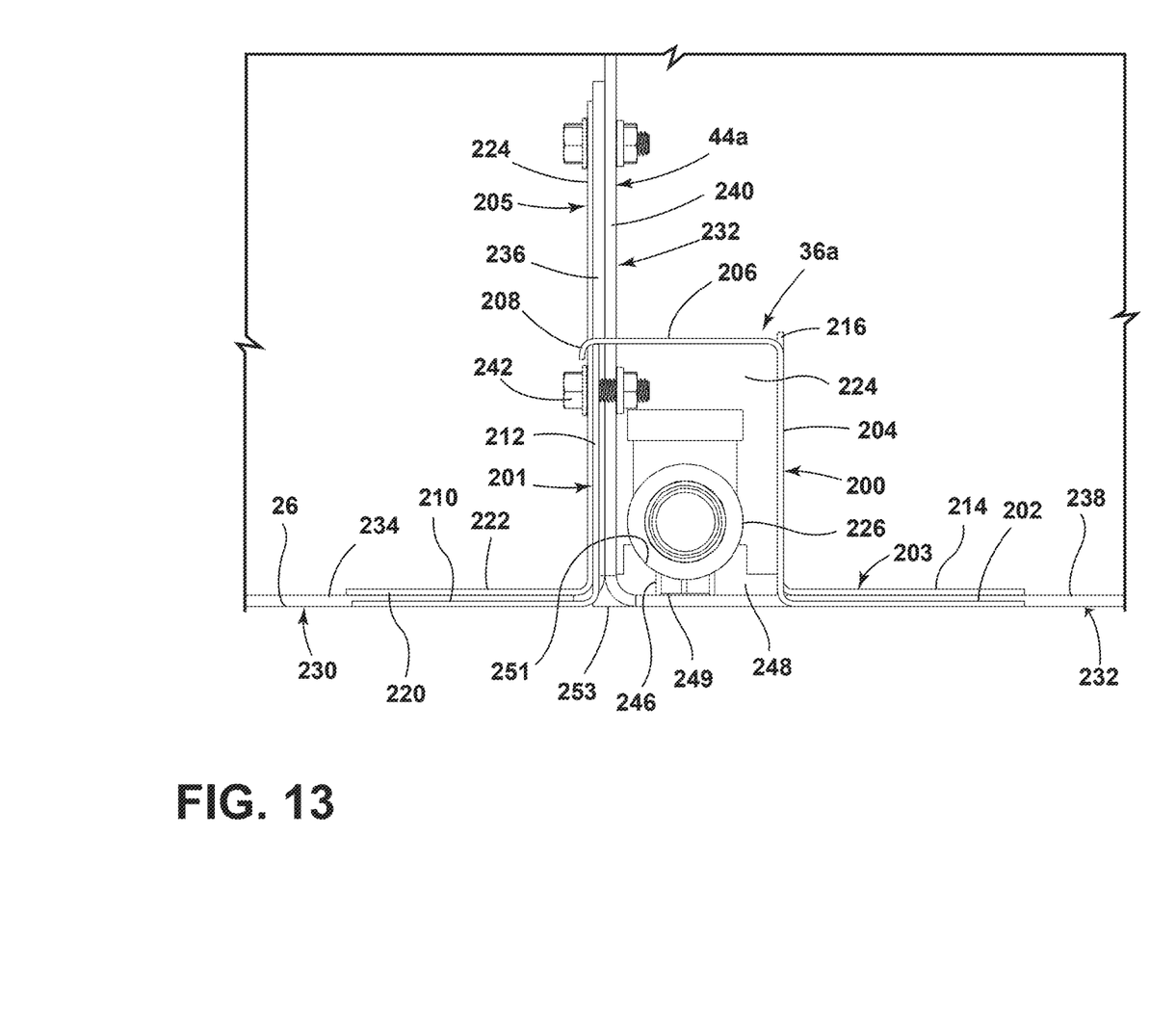
FIG. 13 is an enlarged side elevation view of the support assembly of FIG. 11.
Figure 14:
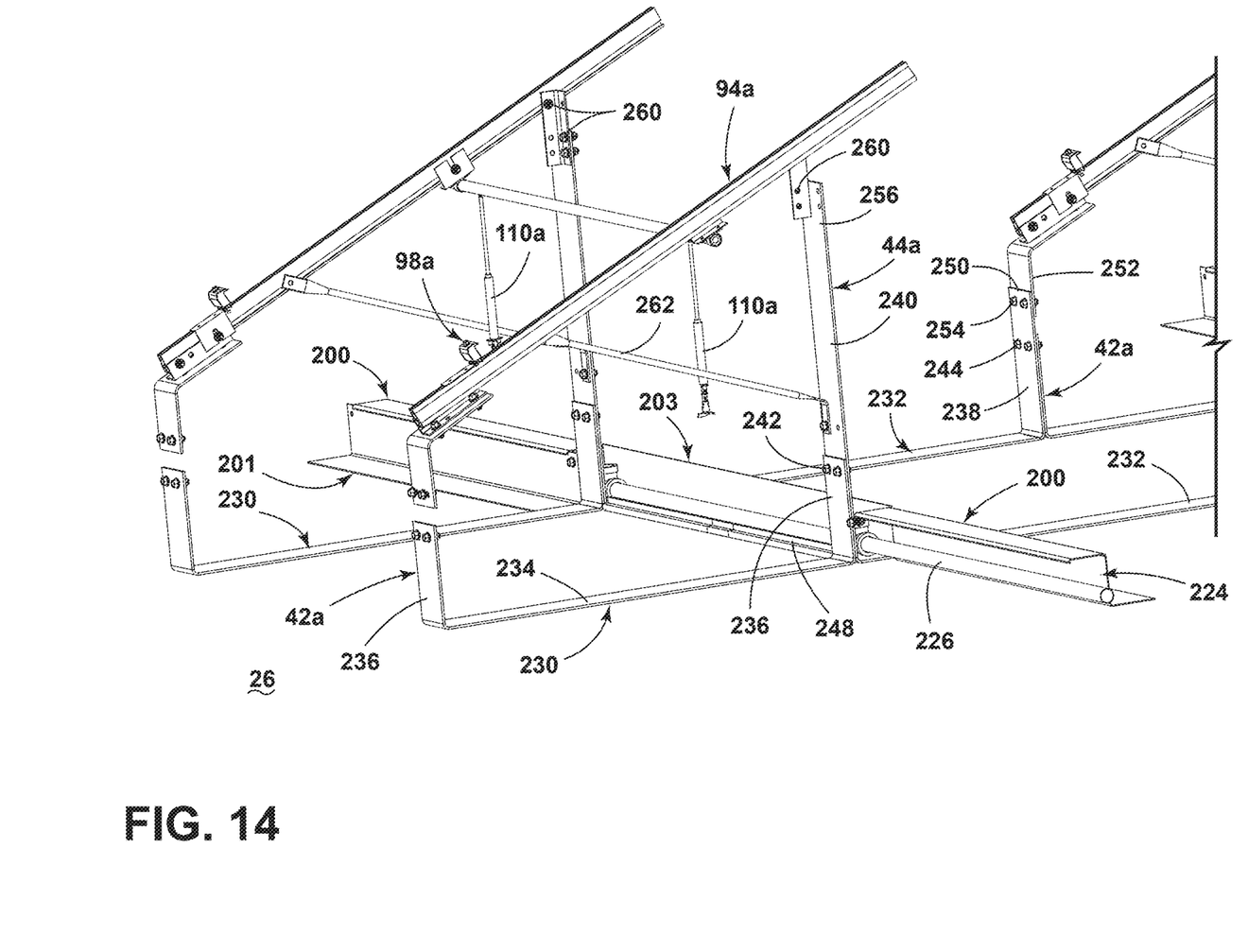
FIG. 14 is a perspective view of the support assembly of FIG. 11, with portions of an elongated rail removed.

In the illustrated example, each elongated rail 36a, 38a (FIGS. 12 and 13) includes a first member 200, a second member 201, a first bridging member 203 and a second bridging member 205. The first member 200 has a Z-shaped cross-sectional configuration with a bottom wall 202, a side wall 204 extending orthogonally upward from the bottom wall 202, a top wall 206 extending orthogonally inward from the side wall 204, and a flange portion 208 curving downward from the top wall 206. The second member 201 has an L-shaped cross-sectional configuration having a bottom wall 210 and a side wall 212 extending orthogonally upward from the bottom wall 210. The first and second bridging members 203, 205 each have an L-shaped cross-sectional configuration with the first bridging member 203 having a bottom wall 214, a side wall 216 extending orthogonally upward from the bottom wall 214, and the second bridging member 205 having a bottom wall 220 and a side wall 222 extending orthogonally upward from the bottom wall 224. Each of the walls of the first and second member 200, 201 and the first and second bridging members 203, 205 may include reliefs or apertures (not shown) extending therethrough to allow fluid to pass through the member 200, 201, 203, 205 and/or to reduce the weight thereof. As best illustrated in FIGS. 13 and 14, the first member 200, the second member 201, the first bridging member 203 and the second bridging member 205 are configured and cooperate with one another to form a longitudinally-extending channel 224 configured to receive and route water supply lines 226 and/or electrical lines (not shown) associated with the solar panel(s) 48a therethrough.

Figure 11:
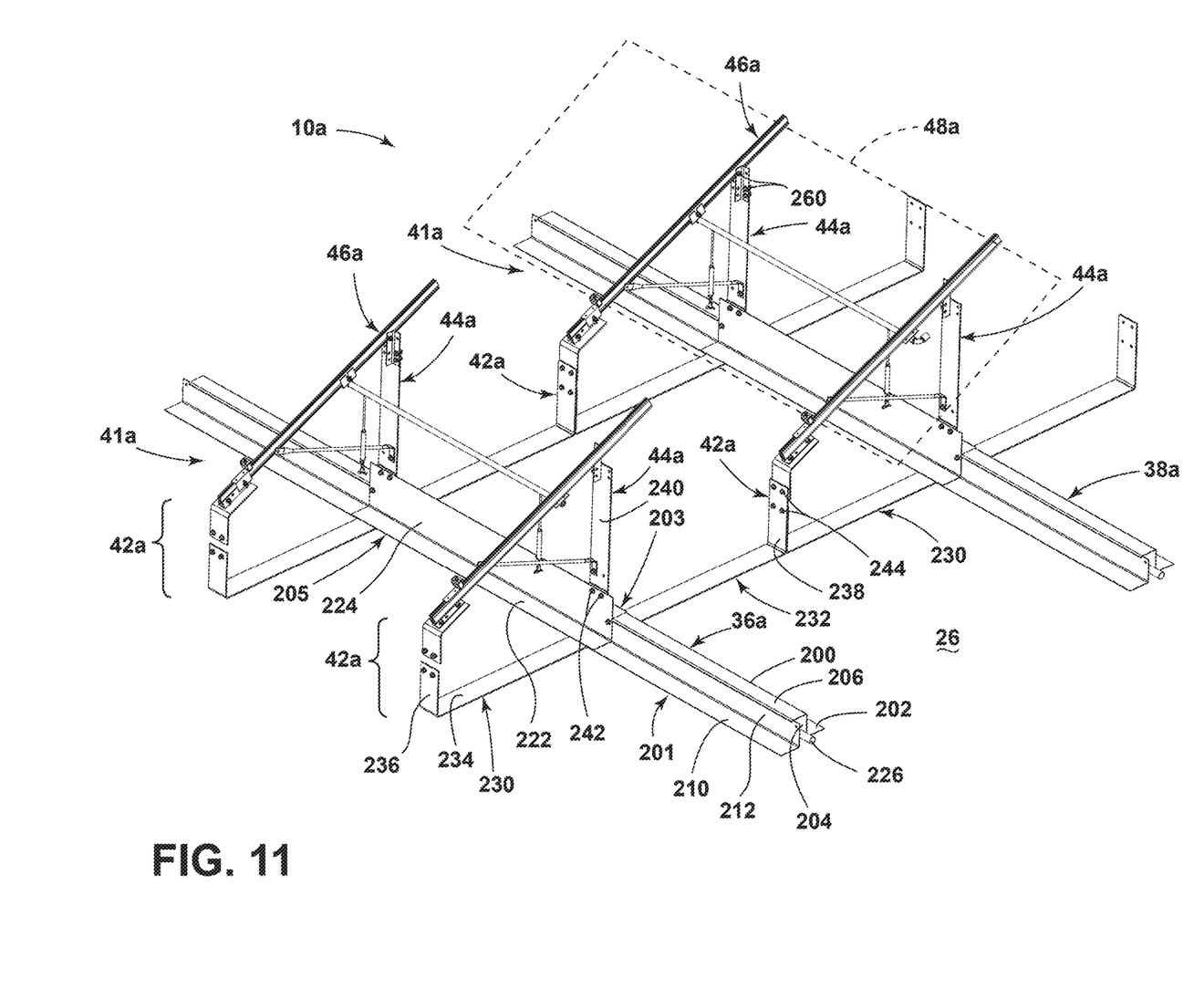
FIG. 11 is a perspective view of an alternative embodiment of the irrigation arrangement support assembly.

The support assembly 10a may further include a plurality of load straps or brackets 230, 232 extending between and coupling the rails 36a, 38a to one another. In the illustrated example, each load strap 230 includes a body portion 234 configured to abut the roof surface 26, and a pair of orthogonally-extending end portions 236 extending upwardly from the body portion 234, while each load strap 232 includes a body portion 238 configured to abut the roof surface 26 and a pair of orthogonally-extending end portions 240, 242.

In assembly, one end portion 236 of the load strap 230 is connected to the end portion 242 of the load strap 232, the second member 201 and the second bridging member 205 via a plurality of mechanical fasteners such as bolts 242, with the end portion 242 extending upwardly and forming part of the leg 44a. The opposite end portion 236 of the load strap 230 is connected to the end portion 238 of the load strap 232 via a plurality of mechanical fasteners such as bolts 244, with the end portion 240 forming part of the leg 42a. The first member 200 and the second member 201 are positioned proximate one another such that the flange portion 208 overlaps the side wall 212 of the second member 201, and such that the top wall 206 of the first member 200 is supported by side wall 212 of the second member 201 should the top wall 206 of the first member deflect downwardly due to a force being exerted thereon such as by a pedestrian walking or standing on the elongated rail 36a, 38a. The first and second members 200, 201 and the first and second bridging members 203, 205 are further positioned with respect to one another such that the channels 224 formed therebetween are aligned with one another. As best illustrated in FIGS. 12-14, a support member 248 may be utilized to support the water supply line 226 above the roof surface 26, where the support member 248 includes drainage passages 249 extending between an upper arcuate water line supporting surface 251 and a bottom surface 253.

Figure 15:
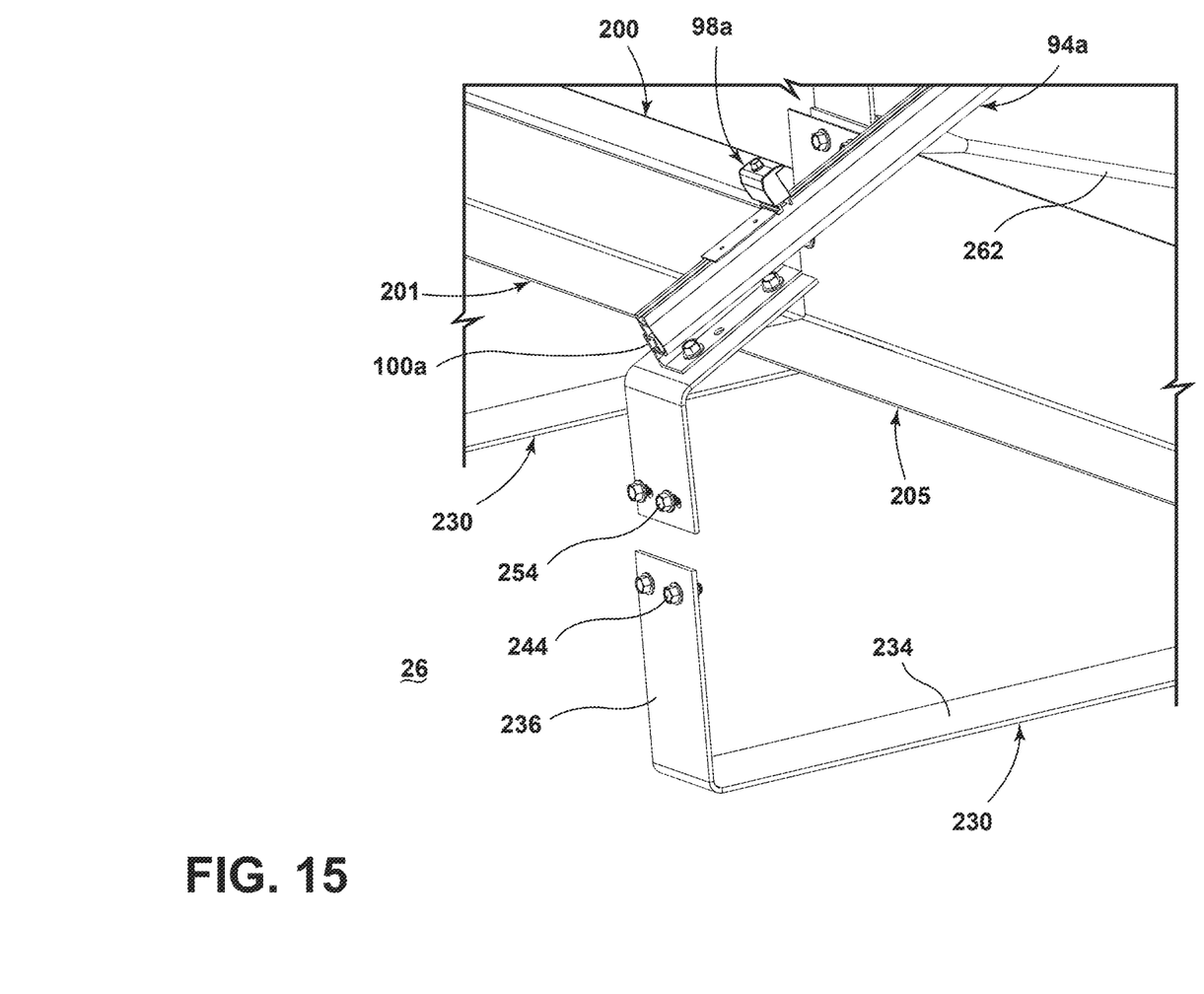
FIG. 15 is an enlarged perspective view of the support assembly of FIG. 11.

As noted above, the support arrangement 41a extends upwardly from the rails 36a, 38a and supports the panel support assembly 46a with the front legs 42a and the rear legs 44a. An upper end 250 of the end portion 238 of the load strap 232 is connected to the solar panel support bars 94a via a support bracket 252 via a plurality of bolts 254, while the upper end 256 of the end portion 240 of the load strap 232 is connected to an opposite end of the solar panel support bar 94a via a support bracket 260. A plurality of angular structural supports 262 may be provided between the solar panel support 94a and the legs. 44a.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

The invention claimed is:

1. A solar panel and irrigation arrangement support assembly, comprising:

first and second elongated rails each configured to be supported by a roof surface, the first elongated rail including a first longitudinally-extending channel;

a plurality of vertical legs each having a first end coupled to at least one of the first and second elongated rails, and a second end;

a support assembly coupled to the second end of the plurality of legs and configured to support a solar panel; and an irrigation arrangement, comprising:

an irrigation line located within and extending along the first longitudinally extending channel of the first elongated rail; and a fluid dispersion member in fluid communication with the irrigation line and configured to be located between the solar panel and plant matter supported by the roof surface such that the fluid dispersion member can provide fluid to the plant matter located directly vertically below the solar panel, wherein the fluid dispersion member is fixed relative to the support assembly.

2. The solar panel and irrigation arrangement support assembly of claim 1, wherein at least one of the elongated rails has a C-shaped cross-sectional configuration.

3. The solar panel and irrigation arrangement support assembly of claim 1, wherein the second rail includes a second longitudinally-extending channel.

4. The solar panel and irrigation arrangement support assembly of claim 3, further comprising:

an electrical line configured to be operably coupled to the solar panel and located within and extending along the second longitudinally-extending channel of the second elongated rail.

5. The solar panel and irrigation arrangement support assembly of claim 1, wherein the plurality of legs includes a pair of forward legs and a pair of rearward legs, wherein one of the forward legs is attached to the first elongated rail and the other forward leg is attached to the second elongated rail, and wherein the one of the rearward legs is attached to the first elongated rail and the other rearward leg is attached to the second elongated rail.

6. The solar panel and irrigation arrangement support assembly of claim 5, wherein a length of each of the pair of forward legs and/or of each of the pair of rearward legs is adjustable.

7. The solar panel and irrigation arrangement support assembly of claim 5, wherein a length of each of the legs is adjustable.

8. The solar panel and irrigation arrangement support assembly of claim 1, further comprising:

at least one hanger extending downwardly from the support assembly and configured to support the water dispersion member beneath the solar panel.

9. A solar panel and irrigation arrangement support assembly, comprising:

a first elongated rail configured to be supported by a roof surface;

a second elongated rail configured to be supported by the roof surface and laterally spaced from the first elongated rail;

a plurality of legs extending upwardly from the first and second elongated rails;

a support assembly supported by the plurality of legs, wherein the support assembly is configured to support a solar panel;

a first load strap coupled to and extending between the first and second elongated rails, wherein the first load strap is configured to abut the roof surface; and at least one planter module abutting the first load strap, wherein a weight of the planter module is configured to exert a downwardly directed force on the first load strap.

10. The solar panel and irrigation arrangement support assembly of claim 9, further comprising:

a second load strap coupled to and extending between the first and second elongated rails, the first and second load straps spaced from one another, wherein the second load strap is configured to abut the roof surface.

11. The solar panel and irrigation arrangement support assembly of claim 10, further comprising:

a third elongated rail laterally spaced from the first elongated rail and from the second elongated rail, and a third load strap coupled to and extending between the second elongated rail and the third elongated rail, wherein the third load strap is configured to abut the roof surface.

12. The solar panel and irrigation arrangement support assembly of claim 9, further comprising:

a third elongated rail laterally spaced from each of the first and second elongated rails, and a second load strap coupled to and extending between the second and third elongated rails, wherein the second load strap is configured to abut the roof surface.

13. The solar panel and irrigation arrangement support assembly of claim 9, wherein the first elongated rail includes a first longitudinally-extending channel; and further comprising:

an irrigation line located within and extending along the first longitudinally extending channel.

14. The solar panel and irrigation arrangement support assembly of claim 13, further comprising:

a fluid dispersion member in fluid communication with the irrigation line and configured to be located between the solar panel and the roof surface and configured to supply fluid to plant matter located directly vertically below the solar panel.

15. The solar panel and irrigation arrangement support assembly of claim 13, wherein the second elongated rail includes a second longitudinally-extending channel.

16. The solar panel and irrigation arrangement support assembly of claim 15, further comprising:

an electrical line configured to be operably coupled with the solar panel and located within and extending along the second longitudinally extending channel.

* * * * *